US006871834B2

(12) United States Patent
Fortino et al.

(10) Patent No.: US 6,871,834 B2
(45) Date of Patent: Mar. 29, 2005

(54) CIRCUIT FOR OPERATING A VALVE CLOSURE SYSTEM

(75) Inventors: Richard D. Fortino, Alma, MI (US); David N. Maniez, Jr., St. Louis, MI (US)

(73) Assignee: Powell Technologies LLC, St. Louis, MI (US)

( * ) Notice: Subject to any disclaimer, the term of this patent is extended or adjusted under 35 U.S.C. 154(b) by 0 days.

(21) Appl. No.: 10/725,660

(22) Filed: Dec. 2, 2003

(65) Prior Publication Data

US 2004/0108478 A1 Jun. 10, 2004

Related U.S. Application Data

(60) Provisional application No. 60/430,490, filed on Dec. 2, 2002.

(51) Int. Cl.[7] .................................................. F16K 31/00

(52) U.S. Cl. ............................................ 251/26; 60/399

(58) Field of Search ........................ 251/26, 59; 60/399, 60/403, 406

(56) References Cited

U.S. PATENT DOCUMENTS 3,279,484 A * 10/1966 Brinkel ........................ 415/49
4,872,482 A * 10/1989 Jarrett ........................ 137/554
6,053,202 A * 4/2000 Cunningham .......... 137/596.16

* cited by examiner

*Primary Examiner*—F. Daniel Lopez
*Assistant Examiner*—John K. Fristoe, Jr.
(74) *Attorney, Agent, or Firm*—George L. Boller

(57) ABSTRACT

A circuit (10) for operating a bi-directional air motor (12) of a valve closure system for enabling a tank valve to be discretionally operated to either open or closed condition either at the tank by attending personnel or from a remote location, with the capability of closing the tank valve in the event of emergency from a remote location in the absence of attending personnel. The circuit can be constructed using two commercially available valve assemblies ((24, 26).

14 Claims, 1 Drawing Sheet

CIRCUIT FOR OPERATING A VALVE CLOSURE SYSTEM

REFERENCE TO RELATED APPLICATION AND PRIORITY CLAIM

This application derives from the following commonly owned patent application, the priority of which is expressly claimed: Provisional Application No. 60/430,490, filed on 02 Dec. 2002 now abandoned in the names of RICHARD FORTINO and DAVID N. MANIEZ JR.

FIELD OF THE INVENTION

This invention relates generally to valve closure systems that comprise a motor for turning a rotary actuator of a shut-off valve to operate the valve from open to closed. Such valve closure systems allow valves of vessels, such as cylinders and containers, that hold fluids, such as industrial gases for example, to be quickly closed from a remote location. More particularly, the invention relates to an improvement for enabling a motor that is capable of bi-directional operation to be discretionally operated to either open or close the valve while retaining the ability to quickly close the valve from a remote location.

BACKGROUND OF THE INVENTION

Examples of valve closure systems to which principles of the present invention may be applied are illustrated in commonly owned U.S. patent application Ser. Nos. 10/418,693 and 10/418,691, filed 18 Apr. 2003, which are incorporated herein by reference. The inventive principles may also be applied to various other valve closure systems.

In certain environments, it may be desirable for a valve closure system to be configured such that when installed on an open shut-off valve of a cylinder or container, it is capable of operating only to close the valve. When so configured, such a valve closure system needs to be removed from the valve before the valve can be re-opened. Removal is typically accomplished by attending personnel. Removal of a valve closure system may be inconvenient and/or time-consuming and if the system has appreciable mass, the task of removing it may be burdensome to attending personnel.

In those cases it may be preferable to enable the attending personnel to re-open the valve without having to remove the closure system from the shut-off valve. But when a valve closure system is enabled to open and close a shut-off valve under control of attending personnel, the ability to assure closure of an open valve from a remote location in the absence of attending personnel on the scene may continue to be required, especially where hazardous fluids may be escaping, and assurance of prompt valve closure is needed.

SUMMARY OF THE INVENTION

The present invention relates to an improvement for enabling a bi-directional motor of a valve closure system to be discretionally operated to either open or close a valve on which the system is installed, while retaining the ability to close an open valve from a remote location in the absence of attending personnel on the scene.

The invention endows a valve closure system with the ability to re-open a closed shut-off valve without the need to remove the closure system from the valve.

A presently preferred embodiment of the invention that will be described herein comprises two commercially available valves connected in a novel pneumatic circuit with a bi-directional, i.e. reversible, air motor of the closure system. The two valves are adapted to be connected to on-site pneumatic power.

One of the two valves is a selector valve comprising an operator that is selectively operable from a stand-by neutral position to a first position to apply air from the on-site source "shop air" or "plant air") to a first inlet port of the air motor when the shut-off valve on which the closure system is mounted is to be operated from open to closed, and to a second position to apply air from the on-site source to a second inlet port of the air motor when the shut-off valve is to be operated from closed to open. In the stand-by position, the selector valve applies no air to either inlet port of the air motor. In the disclosed preferred embodiment, the selector valve operator is a manual one intended to be operated manually by on-site personnel.

The other of the two valves is a three-port directional check valve that is interposed between a source of on-site "emergency air", a first outlet port of the selector valve, and the first inlet port of the air motor.

The air motor has an exhaust outlet port through which air is exhausted after having passed through the motor from either of its inlet ports.

The selector valve also has a second outlet port communicated to the second inlet port of the air motor, an inlet port communicated to "plant air", and two exhaust ports.

Accordingly, one general aspect of the invention relates to a circuit for operating a valve closure system that has an air motor for turning a handle of a tank valve. The circuit comprises a first valve that has a first port for connection to an air source and a second port, and that is selectively operable to a first position for closing the first port to the second port and to a second position for opening the first port to the second port. The circuit further comprises a second valve that has a first port connected to the second port of the first valve, a second port for connection to a port of the air motor that operates the air motor, and a third port for connection to an emergency air source, and that, in the absence of delivery of emergency air to the third port, opens the first port to the second port to allow bi-directional airflow between its first port and its second port while closing the third port to both its first and second ports, and upon delivery of emergency air to the third port forces the third port to open to its second port regardless of whether its second port is open or closed to its first port.

Another general aspect relates to a valve circuit for operating a valve closure system that has an air motor for turning a handle of a tank valve. The valve circuit comprises a non-emergency air port for connection to a non-emergency air source, an emergency air port for connection to an emergency air source, and an outlet port for connection to a port of the air motor that operates the air motor. A valve arrangement operatively relates the non-emergency air port, the emergency air port, and the outlet port and comprises a first valve mechanism that is selectively operable to a first position for causing air from the non-emergency air port to be delivered to the outlet port to operate the air motor in the absence of emergency air being delivered to the emergency air port, and to a second position that does not cause delivery of air from the non-emergency air port to the outlet port. The valve arrangement further comprises a second valve mechanism that upon delivery of emergency air to the emergency air port forces the outlet port open to the emergency air port regardless of whether the first valve mechanism is in its first position or its second position.

Still another general aspect relates to a valve closure system comprising an air motor for turning a handle of a tank valve and a circuit for operating the air motor. The circuit comprises a) a non-emergency air port for connection to a non-emergency air source, b) an emergency air port for connection to an emergency air source, c) an outlet port for connection to a port of the air motor that operates the air motor, d) a valve arrangement for operatively relating the non-emergency air port, the emergency air port, and the outlet port. The valve arrangement comprises e) a first valve mechanism that is selectively operable to a first position for causing air from the non-emergency air port to be delivered to the outlet port to operate the air motor in the absence of emergency air being delivered to the emergency air port, and to a second position that does not cause delivery of air from the non-emergency air port to the outlet port, and f) a second valve mechanism that upon delivery of emergency air to the emergency air port forces the outlet port open to the emergency air port regardless of whether the first valve mechanism is in its first position or its second position.

Still another general aspect relates to a valve closure system comprising a bi-directional air motor operable in one sense for turning a handle of a tank valve to operate the tank valve from open to closed and in an opposite sense for turning the handle to operate the tank valve from closed to open. The motor has a first port for operating the motor in the one sense, a second port for operating the motor in the opposite sense, and an exhaust port for exhausting air delivered to either the first or second port. A circuit for operating the air motor comprises a) a non-emergency air port for connection to a non-emergency air source, b) an emergency air port for connection to an emergency air source, c) an outlet port for connection to the first port of the air motor, and d) a valve arrangement for operatively relating the non-emergency air port, the emergency air port, and the outlet port. The valve arrangement is operable e) to a condition that causes air from the non-emergency air port to be delivered to the first port of the air motor, but not the second port of the air motor, in the absence of emergency air being delivered to the emergency air port, f) to a condition that causes air from the non-emergency air port to be delivered to the second port of the air motor, but not the first port of the air motor, in the absence of emergency air being delivered to the emergency air port, g) to a condition that does not cause delivery of air from the non-emergency air port to either the first or second port of the air motor, and h) to a condition that upon delivery of emergency air to the emergency air port causes air from the emergency air port to be delivered to the first port of the air motor.

BRIEF DESCRIPTION OF DRAWINGS

The accompanying drawing, which is incorporated herein and constitutes part of this disclosure, illustrates a presently preferred embodiment of the invention, and together with the written description given herein discloses principles of the invention in accordance with a best mode contemplated at this time for carrying out the invention.

DETAILED DESCRIPTION

Figure 1:
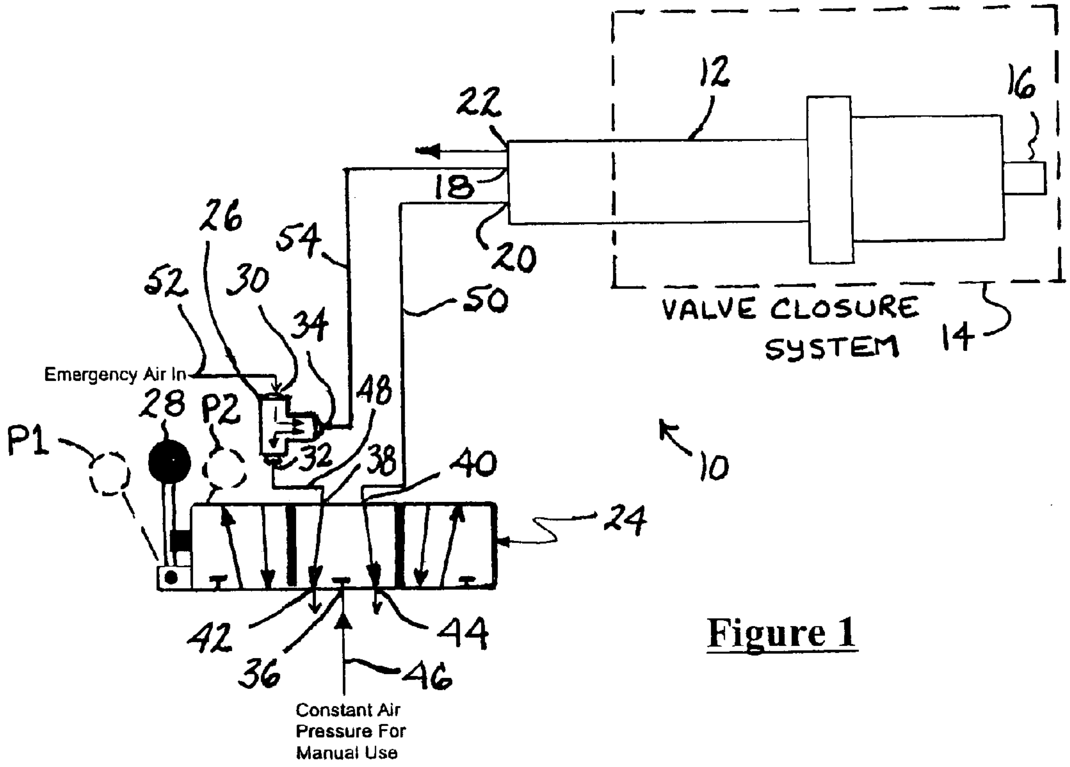
FIG. 1 is a schematic diagram of a pneumatic circuit associated with the air motor of a valve closure system in accordance with principles of the present invention.

FIG. 1 illustrates a presently preferred embodiment of pneumatic circuit 10 associated with an air motor 12 of a valve closure system 14 in accordance with principles of the present invention. Full detail of valve closure system 14 may be obtained from the referenced provisional patent application identified above and incorporated herein. When installed on a shut-off valve, closure system 14 is effective to turn an actuator, such as a handle, of the shut-off valve when motor 12 is operated. For example, motor 12 comprises a shaft 16 that can be coupled via a suitable adapter or coupling with the shut-off valve handle to rotate the handle about an axis coincident with that of shaft 16.

Air motor 12 is a commercially available, bi-directional, i.e. reversible, device that has two inlet ports 18, 20 and an exhaust port 22. When air under pressure is supplied to port 18, air motor 12 turns shaft 16 in a clockwise sense about the shaft axis, with the air being exhausted through port 22 after having passed through the motor. When air under pressure is supplied to port 20, air motor 12 turns shaft 16 in a counterclockwise sense about the shaft axis, with the air being exhausted through port 22 after having passed through the motor. When valve closure system 14 is operatively coupled with a shut-off valve, motor shaft 16 rotation in a clockwise sense will operate the shut-off valve, if open, from open to closed, and rotation of motor shaft 16 in a counterclockwise sense will operate the shut-off valve, if closed, from closed to open.

Circuit 10 comprises two commercially available valves 24, 26 connected in circuit with air motor 12. Valves 24, 26 are adapted to be connected to on-site pneumatic power for operating motor 12.

Valve 24 is a selector valve comprising an internal spool that is shifted axially by an external operator 28, such as a lever. Operator 28 is selectively operable from a stand-by neutral position as shown to a first position P1 that as will be more fully explained positions the valve spool to cause air under pressure from an on-site source "shop air" or "plant air") to be supplied through valve 26 to motor inlet port 18, causing the motor to operate in a sense that will close the shut-off valve if open. Operator 28 is also selectively operable from the stand-by position to a second position P2 that as will be more fully explained positions the valve spool to cause air under pressure from the on-site source to be supplied directly to motor inlet port 20, causing the motor to operate in a sense that will open the shut-off valve if closed.

Valve 26 is a three-port directional check valve that comprises two inlet ports 30, 32, and an outlet port 34. Valve 26 allows flow from inlet port 30 to outlet port 34, but blocks flow in the reverse direction; it allows flow in the direction between port 32 and port 34.

Valve 24 is a directional control valve that comprises an inlet port 36, two outlet ports 38, 40, and two exhaust ports 42, 44. Operator 28 assumes the stand-by position with valve 24 in the stand-by position shown in FIG. 1.

Inlet port 36 of valve 24 is communicated by a line, or conduit, 46 to the source of air under pressure, i.e. "shop air" or "plant air". Outlet port 38 is communicated by a line 48 to port 32 of valve 26. Outlet port 40 is communicated by a line 50 to port inlet port 20 of air motor 12. Although a line 48 has been shown and described as the means for communicating port 32 and port 38, certain specific valves may have port geometries that allow port 32 to thread directly to port 38 so that no separate line 48 is needed.

Inlet port 32 of valve 26 is communicated by a line 52 to a source of "emergency air". Outlet port 34 is communicated by a line 54 to motor inlet port 18.

With operator 28 and valve 24 in the stand-by position, no shop or plant air is passed by valve 24 from port 36 to either outlet port 38 or 40, and consequently, motor 12 can be operated, as will be more fully explained shortly, only if "emergency" air is supplied to port 30 of valve 26. However, port 40 is open to port 44 and port 38 is open to port 42.

Placement of operator 28 in position P2 from stand-by position by pivoting operator 28 in one sense from stand-by position operates valve 24 by shifting the valve spool so as to close the path between ports 38 and 42 and open port 38 to port 36 causing valve 24 to pass air from inlet port 36 to outlet port 38. The air passes through line 48 to port 32 of valve 26. Valve 26 passes the air from port 32 to port 34. The air passes through line 54 to motor port 18 causing motor 12 to rotate shaft 16 clockwise. Valve 26 blocks passage of the shop or plant air to port 30. With operator 28 in position P2, port 40 remains open to port 44, providing an exhaust path for the motor that parallels the path through exhaust port 22.

Placement of operator 28 in position P1 from stand-by position by pivoting operator in an opposite sense from stand-by position operates valve 24 by shifting the valve spool so as to close the path between ports 40 and 44 and open port 40 to port 36 causing valve 24 to pass air from inlet port 36 to outlet port 40. The air passes through line 50 to motor port 20 causing motor 12 to rotate shaft 16 counterclockwise. With operator 28 in position P1, port 38 remains open to port 42, and with port 34 being open to port 32 in valve 26, the two valves 24, 26 provide an exhaust path from motor port 18 that parallels the path through exhaust port 22. With no "emergency air" being applied to port 30, valve 24 closes the exhaust flow path between ports 34 and 32 to port 30.

If "emergency air" is applied to port 30 while operator 28 and valve 24 are in stand-by position, it will pass through valve 26 to port 34 and through line 54 to port 18 to turn motor shaft 16 clockwise. Valve 26 closes port 32 so that the emergency air is not short circuited away from the motor through valve 24, and consequently all of the "emergency air" passes to the motor and is exhausted through exhaust port 22.

If "emergency air" is applied to port 30 while operator 28 is in position P1, air will pass from either or both ports 30, 26 (depending on respective air pressures) to turn motor shaft 16 clockwise. Because an exhaust path exists through valve 24 between ports 40 and 44, air can exhaust from the motor through it and/or exhaust port 22.

If "emergency air" is applied to port 30 while operator 28 is in position P2, emergency air will be applied to motor port 18 at the same time as air is being applied via valve 24 to motor port 20. Assuming that the pressures at the motor ports 18, 20 are substantially equal, the application of emergency air will tend to stall the motor. The application of emergency air will typically be accompanied by an alarm signal of some sort that will be promptly noticed by the personnel presently operating valve 24 to open the shut-off valve. It is expected that the personnel will thereupon release operator 28 so that it and valve 24 will return to neutral stand-by position, resulting in removal of air pressure from motor port 20 so that the emergency air can then be effective to operate motor 12 to close the shut-off valve.

If a vessel or tank has more than one valve each requiring the use of its own valve closure system, each such valve closure system may have its own circuit like the one described.

While a presently preferred embodiment of the invention has been illustrated and described, it should be appreciated that principles of the invention are applicable to all embodiments that fall within the scope of the claims that follow hereinafter.

What is claimed is:

1. A circuit for operating a valve closure system that has an air motor for turning a handle of a tank valve, the circuit comprising:

a first valve that has a first port for connection to an air source and a second port, and that is selectively operable to a first position for closing the first port to the second port and to a second position for opening the first port to the second port; and a second valve that has a first port connected to the second port of the first valve, a second port for connection to a port of the air motor that operates the air motor, and a third port for connection to an emergency air source, and that, in the absence of delivery of emergency air to the third port, opens the first port to the second port to allow bi-directional airflow between its first port and its second port while closing the third port to both its first and second ports, and upon delivery of emergency air to the third port forces the third port to open to its second port regardless of whether its second port is open or closed to its first port.

2. A valve circuit for operating a valve closure system that has an air motor for turning a handle of a tank valve, the valve circuit comprising:

a non-emergency air port for connection to a non-emergency air source;

an emergency air port for connection to an emergency air source;

an outlet port for connection to a port of the air motor that operates the air motor;

a valve arrangement for operatively relating the non-emergency air port, the emergency air port, and the outlet port comprising a first valve mechanism that is selectively operable to a first position for causing air from the non-emergency air port to be delivered to the outlet port to operate the air motor in the absence of emergency air being delivered to the emergency air port, and to a second position that does not cause delivery of air from the non-emergency air port to the outlet port, and a second valve mechanism that upon delivery of emergency air to the emergency air port forces the outlet port open to the emergency air port regardless of whether the first valve mechanism is in its first position or its second position.

3. A valve closure system comprising:

an air motor for turning a handle of a tank valve; and a circuit for operating the air motor, wherein the circuit comprises a) a non-emergency air port for connection to a non-emergency air source, b) an emergency air port for connection to an emergency air source, c) an outlet port for connection to a port of the air motor that operates the air motor, d) a valve arrangement for operatively relating the non-emergency air port, the emergency air port, and the outlet port, wherein the valve arrangement comprises e) a first valve mechanism that is selectively operable to a first position for causing air from the non-emergency air port to be delivered to the outlet port to operate the air motor in the absence of emergency air being delivered to the emergency air port, and to a second position that does not cause delivery of air from the non-emergency air port to the outlet port, and f) a second valve mechanism that upon delivery of emergency air to the emergency air port forces the outlet port open to the emergency air port regardless of whether the first valve mechanism is in its first position or its second position.

4. A valve closure system as set forth in claim 3 wherein the first valve mechanism is embodied in a first valve assembly, the second valve mechanism is embodied in a second valve assembly, and a port of the first valve assembly is in direct communication with a port of the second valve assembly.

5. A valve closure system as set forth in claim 4 wherein the port of the air motor is one that causes the motor to turn in a sense for closing the tank valve.

6. A valve closure system as set forth in claim 5 wherein the air motor comprises a second port for operating the motor in a sense for opening the tank valve.

7. A valve closure system as set forth in claim 6 wherein the circuit comprises an air line directly connecting the second port to another port of the first valve assembly.

8. A valve closure system as set forth in claim 7 wherein the air motor comprises an exhaust port for exhausting air supplied either to its first port or to its second port.

9. A valve closure system as set forth in claim 8 wherein the simultaneous delivery of substantially equal air pressures to its first port and to its second port is effective to stall the air motor.

10. A valve closure system as set forth in claim 3 wherein the port of the air motor is one that causes the motor to turn in a sense for closing the tank valve.

11. A valve closure system as set forth in claim 3 wherein the air motor is disposed on a mounting for mounting on the tank and the valve arrangement is also disposed on the mounting.

12. A valve closure system as set forth in claim 3 wherein the air motor is disposed on a mounting for mounting on the tank and the valve arrangement is disposed apart from the mounting remote from the tank.

13. A valve closure system as set forth in claim 3 wherein the first valve mechanism is embodied in a spool valve assembly having a spool operated by a manual operating handle.

14. A valve closure system comprising:

a bi-directional air motor operable in one sense for turning a handle of a tank valve to operate the tank valve from open to closed and in an opposite sense for turning the handle to operate the tank valve from closed to open, the motor having a first port for operating the motor in the one sense, a second port for operating the motor in the opposite sense, and an exhaust port for exhausting air delivered to either the first or second port; and a circuit for operating the air motor, wherein the circuit comprises a) a non-emergency air port for connection to a non-emergency air source, b) an emergency air port for connection to an emergency air source, c) an outlet port for connection to the first port of the air motor, and d) a valve arrangement for operatively relating the non-emergency air port, the emergency air port, and the outlet port, wherein the valve arrangement is operable e) to a condition that causes air from the non-emergency air port to be delivered to the first port of the air motor, but not the second port of the air motor, in the absence of emergency air being delivered to the emergency air port, f) to a condition that causes air from the non-emergency air port to be delivered to the second port of the air motor, but not the first port of the air motor, in the absence of emergency air being delivered to the emergency air port, g) to a condition that does not cause delivery of air from the non-emergency air port to either the first or second port of the air motor, and h) to a condition that upon delivery of emergency air to the emergency air port causes air from the emergency air port to be delivered to the first port of the air motor.

* * * * *